Patented July 16, 1940

2,208,514

UNITED STATES PATENT OFFICE 2,208,514

MOTOR FUEL

Josef Jannek, Ludwigshafen-on-the-Rhine, and William Hennicke, Mannheim, Germany, assignors to I. G. Farbenindustrie Aktiengesellschaft, Frankfort-on-the-Main, Germany No Drawing. Application September 11, 1937, Serial No. 163,386. In Germany September 11, 1936

3 Claims. (Cl. 44—1)

The present invention relates to the production of valuable solid pulverulent fuels for motors.

In the case of pulverulent carbonaceous fuels for dust fuel motors great importance is placed on a low self-ignition point in order that the compression pressure may be kept as low as possible. On the other hand, the softening point, i. e. the temperature at which the dust tends to agglomerate or become sticky, should be as high as possible in order to exclude trouble in operation by reason of soiling of the injection nozzles, or deposition of pitch on the valves, pistons and the like.

Brown coal dust, however, although fulfilling the said two requirements, is little suitable as a motor fuel by reason of its usually considerable ash content and the relatively large amount of constituents contained therein which cause mechanical corrosion. Fuel dust poor in ash which is more favorable in the said respect, as for example mineral coal dust or solid extracts from mineral coals and brown coals which are practically free from ash, frequently has on the other hand too high an ignition point and at the same time also too low a softening point so that it is difficult to use as motor fuel for the said reasons.

We have now found that the two said properties of a fuel dust which are important for dust motors, namely self-ignition and softening points, can be influenced in a favorable sense, i. e. the ignition point can be lowered and the softening point raised, by treating the powdered extract of coal with oxides of nitrogen or nitric acid, preferably in a concentrated form, in such a manner, i. e. under such conditions of time of treatment, concentration, quantities etc., that nitrogen and oxygen are incorporated with the carbonaceous extract. For example nitrous gases which are obtained by the catalytic combustion of ammonia may be used. Even relatively small amounts of nitrous gases are sufficient because with a small nitrogen and oxygen absorption the fuel is changed to a sufficient degree in the desired way.

Nitric acid in the liquid or vapor form may also be used instead of nitrous gases. Generally speaking such a small amount of nitric acid is advantageous that a subsequent drying of the fuel dust is unnecessary. The nitric acid must be employed in higher proportions than is necessary to simply convert the ashes.

The treatment of the fuel dust may be carried out with nitrous gases or, for example, with gas (air) containing nitric acid vapor, in any suitable apparatus, as for example in a rotary tube, preferably provided with trickling insertions, or in a tube provided with a conveyor worm, or in a container constructed as a shaft with a whirling of the dust with the gas, or by allowing the dust to slide down over inclined surfaces in a zig-zag path, or by allowing the dust to fall freely or while retarded by deflecting bodies, through a vertical shaft. The treatment with aqueous nitric acid is preferably and advantageously effected by spraying the fuel dust in a mixing device, as for example in a mixing worm. The treatment with nitric acid is preferably carried out in the heat, but below the ignition point of the resulting fuel. The heat is supplied before, during or after the addition of the nitric acid. For example the fuel may first be heated and then nitric acid, if necessary preheated, added thereto, or heat may be supplied externally during the addition of the nitric acid. It is especially suitable first to mix the nitric acid, if desired slightly preheated, with the fuel in a suitable way, as for example by spraying through nozzles or with the aid of a mixing worm, and then to bring the mixture to the higher temperatures. This may be effected in a single tube in the first half of which the mixing with acid takes place and in the second half of which the heating takes place. Any nitric acid leaving the end of the tube can be returned to the first part in order to act again on the fuel. Working may be effected, however, in two separate apparatus. By this treatment in the heat not only are the softening and ignition points of the fuels improved but also their thermal efficiency is increased, i. e. for the production of the same power less of the thus pretreated fuels is necessary than of the fuels which have not been treated with nitric acid or only treated therewith at ordinary temperature.

The fuel thus treated may be used directly in the dust motor. In some cases, however, it is preferable to degasify it, i. e. to remove any traces of nitrous gases, by blowing out, for example with air, or in vacuum, or to neutralize it by the addition of basic substances, for example ammonia gas, ammonia water, organic bases and the like, and/or grind it.

The fuel may also be used in admixture with untreated dust or other solid or liquid fuels.

The following examples will further illustrate the nature of this invention, but the invention is not restricted to these examples.

*Example 1*

A mineral coal extract practically free from ash, which has been obtained by extraction under pressure, which has been ground to dust and which has an ignition point of 485° C. and a softening point of 190° C. is treated at ordinary temperature in a tube provided with a conveyor worm, all of V2A-steel, with nitrous gases obtained by the combustion of ammonia, 7 cubic metres of gas being used for each 10 kilograms of fuel dust. After the said treatment, the fuel dust is practically incapable of softening (up to more than 500° C.) and its ignition point is reduced to 186° C. The fuel thus obtained may be used without objection in a Diesel dust motor. It has a good readiness to ignite and does not give rise to trouble in operation by deposition of pitch on or incrustation of the machine parts even after running for a long time.

*Example 2*

10 kilograms of an extract obtained by pressure extraction of mineral coal and having a softening point of 200° C. and an ignition point of 490° C. and ground to fine dust are intimately mixed with 2 liters of nitric acid containing per liter 850 grams of $HNO_3$ in the first half of a tube of V2A-steel provided with a worm, the nitric acid being caused to drop in at several places. In the second half of the tube, the extract is heated to the temperatures given in the following table, column 1.

The fuel thus treated has the following softening and ignition points and gives in a Diesel dust engine the electric power expressed in calories consumed for each horse-power hour.

| Temperature of treatment | Softening point | Lower ignition point | Kilogram calories per H. P. hour |
|---|---|---|---|
| | | Degrees | |
| 80° | Above 500° | 241 | 4500 |
| 120° | Above 500° | 254 | 4200 |
| 150° | Above 500° | 233 | 3800 |

The fuel is thus improved to an increasing extent with increasing temperature. Of the extract treated at 150° C. with nitric acid only 3800 kilogram calories are required for 1 horse-power hour as against 4500 kilogram calories of a fuel treated at 80° C.

What we claim is:

1. A process for the production of pulverulent motor fuel for coal-dust motors comprising treating pulverulent solid extracts of coal with oxides of nitrogen in such a manner that the initial material retains its loose pulverulent condition and nitrogen and oxygen are incorporated with the coal extract.

2. A process for the production of pulverulent motor fuel for coal-dust motors comprising treating pulverulent solid extracts of coal with nitric acid in such a manner that the initial material retains its loose pulverulent condition and nitrogen and oxygen is incorporated with the coal extract.

3. A process for the production of pulverulent motor fuel for coal-dust motors comprising treating pulverulent solid extracts of coal with nitric acid at an elevated temperature but below the ignition point of the final product in such a manner that the initial material retains its loose pulverulent condition and nitrogen and oxygen are incorporated with the coal extract.

JOSEF JANNEK.
WILLIAM HENNICKE.